United States Patent [19]

Juhnke

[11] 3,736,009
[45] May 29, 1973

[54] TUBE CONNECTING MEANS
[75] Inventor: Lawrence H. Juhnke, Niles, Ill.
[73] Assignee: Display Engineers Inc., Skokie, Ill.
[22] Filed: May 10, 1971
[21] Appl. No.: 141,596

[52] U.S. Cl. ........... 287/54 C, 312/257 SK, 211/177, 52/656
[51] Int. Cl. .................................................... F16b 7/04
[58] Field of Search ............ 287/189.36 C, 189.36 D, 287/189.36 H, 189.36 F, 189.35, 54 A, 54 C, 56, 126; 52/665, 656, 475; 312/111, 140, 257 SK; 211/177

[56] References Cited
UNITED STATES PATENTS

| 658,493 | 9/1900 | Trigwell | 287/126 X |
|---|---|---|---|
| 1,678,350 | 7/1928 | Ott | 287/126 X |
| 2,117,950 | 5/1938 | Gibson | 52/665 X |
| 2,159,666 | 5/1939 | Lotz | 52/656 X |
| 2,604,342 | 7/1952 | Holmes | 287/54 C UX |
| 2,941,855 | 6/1960 | Weill | 287/54 C |
| 3,353,853 | 11/1967 | Heywood | 287/54 C |
| 3,462,893 | 8/1969 | Kaiser | 52/665 X |
| 3,484,830 | 12/1969 | Wagner et al. | 287/126 X |
| 3,603,628 | 9/1971 | Smith | 287/54 C X |

Primary Examiner—David J. Williamowsky
Assistant Examiner—Wayne L. Shedd
Attorney—Wilson & Geppert and James A. Geppert

[57] ABSTRACT

A display stand for use as shelving having vertical corner members joined by horizontal members adapted to support flat shelves or plates of any suitable material. The corner members and support members are tubular, and are telescopingly connected together by a channel or U-shaped stub or projection secured to one of said members and adapted to telescope into the open end of the other member, a clip frictionally held in the projection, an internally threaded bearing member supported in the clip and having a top bearing surface to frictionally engage the interior surface of the telescoping tubular member, and a threaded stud received in the bearing and acting to urge the bearing against the interior surface of the tubular member for detachably but rigidly joining said members.

2 Claims, 6 Drawing Figures

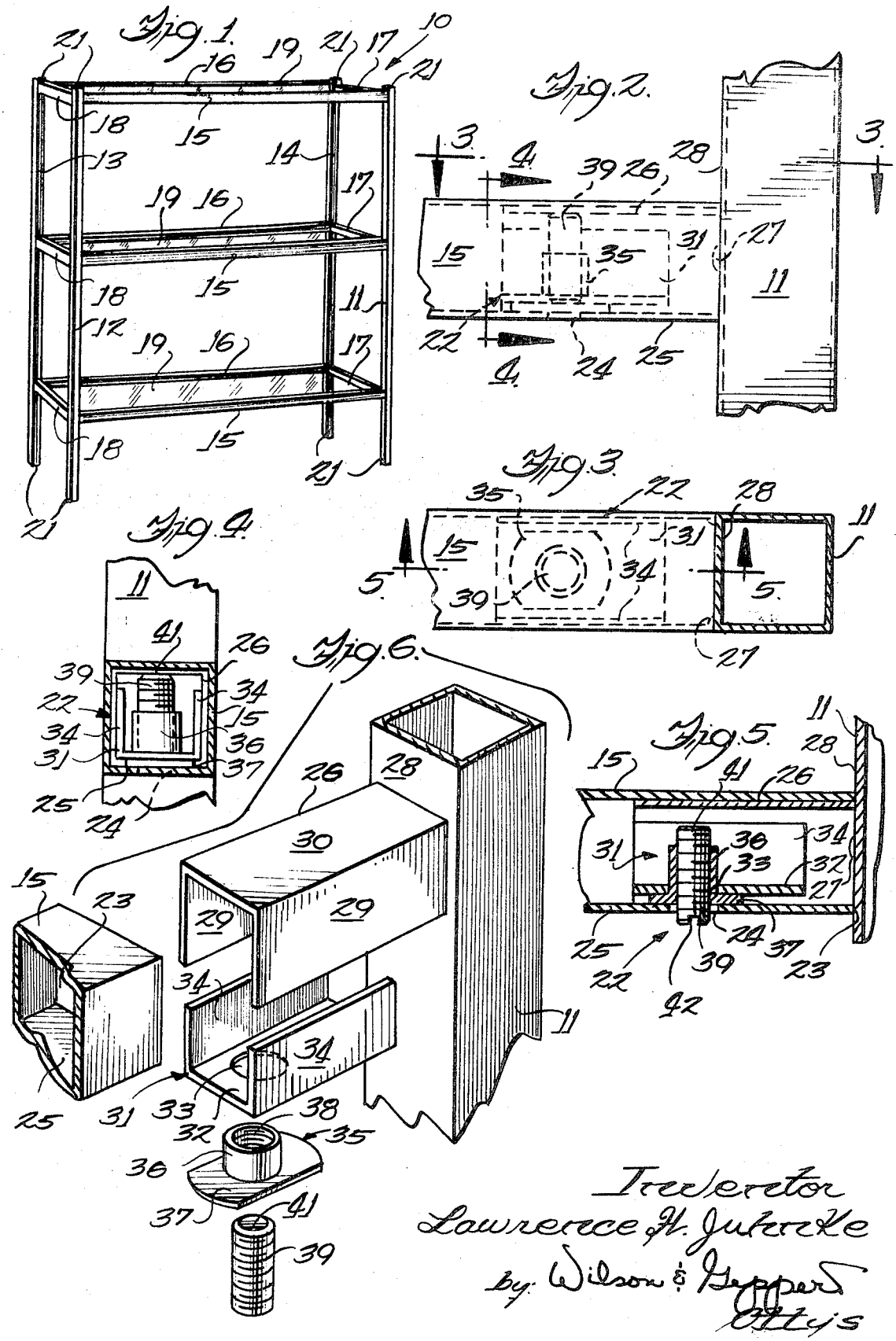

TUBE CONNECTING MEANS

The present invention relates to a display stand, and more particularly to a novel securing means to retain the various components or supporting members of the display stand in assembled relation.

In recent years, shelving and display stands have taken on a more ornamental appearance with the advent of wall mounted shelves using metal standards and brackets, the use of telescoping poles extending from floor to ceiling, metal or wooden spindles and shelves of wood, glass or other decorative materials. The present invention utilizes hollow tubular metal members or components to form the horizontal supporting surfaces for shelves and to a novel securing means to assemble and retain the tubular members together.

Among the objects of the present invention is the provision of a novel display stand or shelving support formed of hollow tubular vertical and horizontal members which are connected or joined together to provide the skeleton frame of the stand, whereby shelves or supporting surfaces of glass, plastic or other suitable material are supported within and on the skeleton frame. The hollow vertical members are capped with suitable non-marring resilient plugs on both the floor-engaging ends and the upper ends.

Another object of the present invention is the provision of a display stand having vertical members with stubs or short projections suitably affixed thereto, which stubs are perpendicular to the longitudinal axis of the vertical members and are secured on at least two adjacent sides of the member to telescopingly receive the open ends of horizontal cross members forming the longitudinal and lateral sides of the frame. The separate horizontal tubular members are suitably secured to the stubs to retain the assembly together.

A further object of the present invention is the provision of a display stand having novel securing means to releasably and frictionally secure the horizontal and vertical tubular members together. A stub or projection perpendicular and secured to the vertical members has a generally U-shape in end elevation and receives a U-shapes channel or U-shaped clip member, with the orientation of the -shapes of the stub and clip member being opposite each other. The clip member contains an opening receiving an internally threaded cylindrical stem of a friction bearing member having a flat bearing surface. A set screw is received in the stem so that the inner end bears against the interior of the stub to force the bearing surface of the bearing member against the interior surface of the hollow member telescoping over the stub.

Further objects are to provide a construction of maximum simplicity, efficiency, economy and ease of assembly, and such further objects, advantages and capabilities as will later more fully appear and are inherently possessed thereby. In the drawing:

FIG. 1 is a perspective view of an assembled display stand having glass shelves.

FIG. 2 is an enlarged side elevational view of a vertical member and frictionally secured horizontal member.

FIG. 3 is a horizontal cross sectional view taken on the line 3—3 of FIG. 2.

FIG. 4 is a vertical cross sectional view taken on the line 4—4 of FIG. 2.

FIG. 5 is a vertical cross sectional view taken on the line 5—5 of FIG. 3.

FIG. 6 is an enlarged exploded perspective view of the novel construction between two tubular members of the display stand.

Referring more particularly to the disclosure in the drawing wherein is shown an illustrative embodiment of the present invention, FIG. 1 discloses a display stand 10 consisting of four vertical support members 11,12,13,14, longitudinal horizontal members 15 and 16, and lateral horizontal members 17 and 18 secured to the vertical members to form a generally rectangular frame or support for shelves 19 formed of glass, plastic or other suitable material. The horizontal members 15,16,17 and 18 are repeated at suitable vertical spacing on the vertical members 11,12,13,14 for each desired shelf 19. Each vertical member is capped at each end by a cap or plug 21 formed of plastic or other suitable long-wearing material.

As more clearly seen in FIGS. 2 through 6, the horizontal support members 15,16,17 and 18 are detachably but rigidly joined to the vertical support members 11,12,13 and 14 by a novel frictional securing means 22. The horizontal members each have opposite open ends 23 with an opening 24 adjacent each end formed in the lower surface 25 as clearly shown in FIG. 5. The vertical member 11 is provided with a downwardly opening channel-shaped stub or projection 26 secured perpendicular thereto, as by welding at 27, on a side 28 of the member. The stub or projection has an inverted generally U-shape when seen in end elevation with generally parallel sides 29,29 connected by a base 30.

Within the stub 26 is positioned a channel or U-shaped clip 31 having a base portion 32 with an opening 33 therein and spaced generally parallel sides 34,34 which frictionally engage the interior surfaces of the opposite sides 29,29 of the stub 26 to be retained therein. A bearing member 35 has a hollow cylindrical stem 36 and a flat bearing surface or flange 37 at one end thereof; the stem being internally threaded at 38. A set screw 39 is threadedly engaged in the stem 36 so that when the inner end 41 of the set screw 39 engages the interior surface of the base 30 of the stub 26, the bearing surface 37 is forced outwardly to frictionally engage the interior surface of the lower surface 25 of the horizontal member 15.

To assemble the stand, each vertical member 11,12,13 or 14 has the vertically spaced sets of stubs or projections 26 for the members 15,16,17 or 18 to be joined thereto. The cylindrical stem 36 of each bearing member 35 is inserted and frictionally held within an opening 33 of a clip 31; the clip then being located and frictionally held within the sides 29,29 of a stub 26. The open end 23 of a horizontal member 15,16,17 or 18 is telescoped over and conformably encompasses the stub 26 with the end 23 abutting the sufrace 28 of the vertical member.

With the horizontal member 15 telescoped over the stub 26 and the clip 31, the opening 24 in the undersurface 25 is axially aligned with the cylindrical stem 36 of the bearing member 35. A set screw 39 is inserted through opening 24 and threaded into the stem by a suitable tool depending on the driving configuration for the screw. The screw illustrated has a slot 42 to receive the blade of a screw driver; however the end of the screw may be recessed for an Allen wrench. The screw is turned until it is wholly within the stem and the inner end 41 engages the interior surface of the base 30 of the stub 26. Further rotation will urge the bearing member 35 downward so that the bearing surface 37 engages and frictionally retains the horizontal member in its telescoped assembled position. To release the horizontal member, the above steps are merely reversed.

Although the vertical members 11,12,13 and 14 are shown and described as having the horizontally oriented stubs 26 secured thereon, it is obvious that either the vertical or the horizontal members could have the stubs thereon with the other members being secured to the stubs. Their present arrangement is preferable, however, as the openings 24 in the undersurface 25 of the horizontal members 15,16,17 and 18 are concealed from normal observation to enhance the aesthetic appearance of the display stand. Also, it is obvious that such a securing system could be readily adopted to a system utilizing cylindrical tubular members.

I claim:

1. A tube connecting means for joining an open-ended tubular member to a second member, comprising a generally channel-shaped stub secured to the second member and telescopingly received in the open end of the tubular member, a clip member received and adjustable in the channel of the stub, a bearing member supported by said clip member, and means to urge the bearing member into frictional engagement with the interior surface of the tubular member, said stub has a base and generally parallel sides with the clip member longitudinally adjustable of the stub, said clip member is generally U-shaped with a base having an opening therein and generally parallel sides, the sides of the clip member frictionally engaging the sides of the stub, said bearing member having an internally threaded generally cylindrical stem received in said opening and a generally flat flange integral with said stem and positioned adjacent the exterior surface of the clip member base, and said urging means comprises a set screw adapted to be received in said bearing member and clip member with the inner end of the screw engaging the interior surface of the stub base to force said bearing member outwardly into engagement with the interior surface of the tubular member, said tubular member having an opening adapted to be axially aligned with the opening in the clip member and said cylindrical stem and set screw when the tubular member is telescoped in operative position on said stub.

2. A tube connecting means for joining an open-ended tubular member to a second member, comprising a generally channel-shaped stub secured at one end to the second member and telescopingly received in the open end of the tubular member, a bearing member in said tubular member having a flanged base seating upon the interior wall of said tubular member, an internally threaded stem projecting upwardly with its threaded opening in alignment with an opening in said inner wall, and a set screw threaded into said stem with the inner end of the screw when tightened frictionally engaging the interior surface of the base of the stub and the flanged base of the bearing member held against the interior wall of the tubular member, said stub having a base and depending generally parallel sides, a U-shaped clip member received in the channel of the stub and longitudinally adjustable therein, the clip member having an opening movable into alignment with an opening in the adjacent wall of the tubular member for access to the bearing member, and means to urge and maintain the bearing member in engagement with the inner surface of the tubular member.

* * * * *